Aug. 8, 1967

R. L. DIENER 3,335,060

SEED-BLANKET NEUTRONIC REACTOR

Filed Sept. 20, 1965

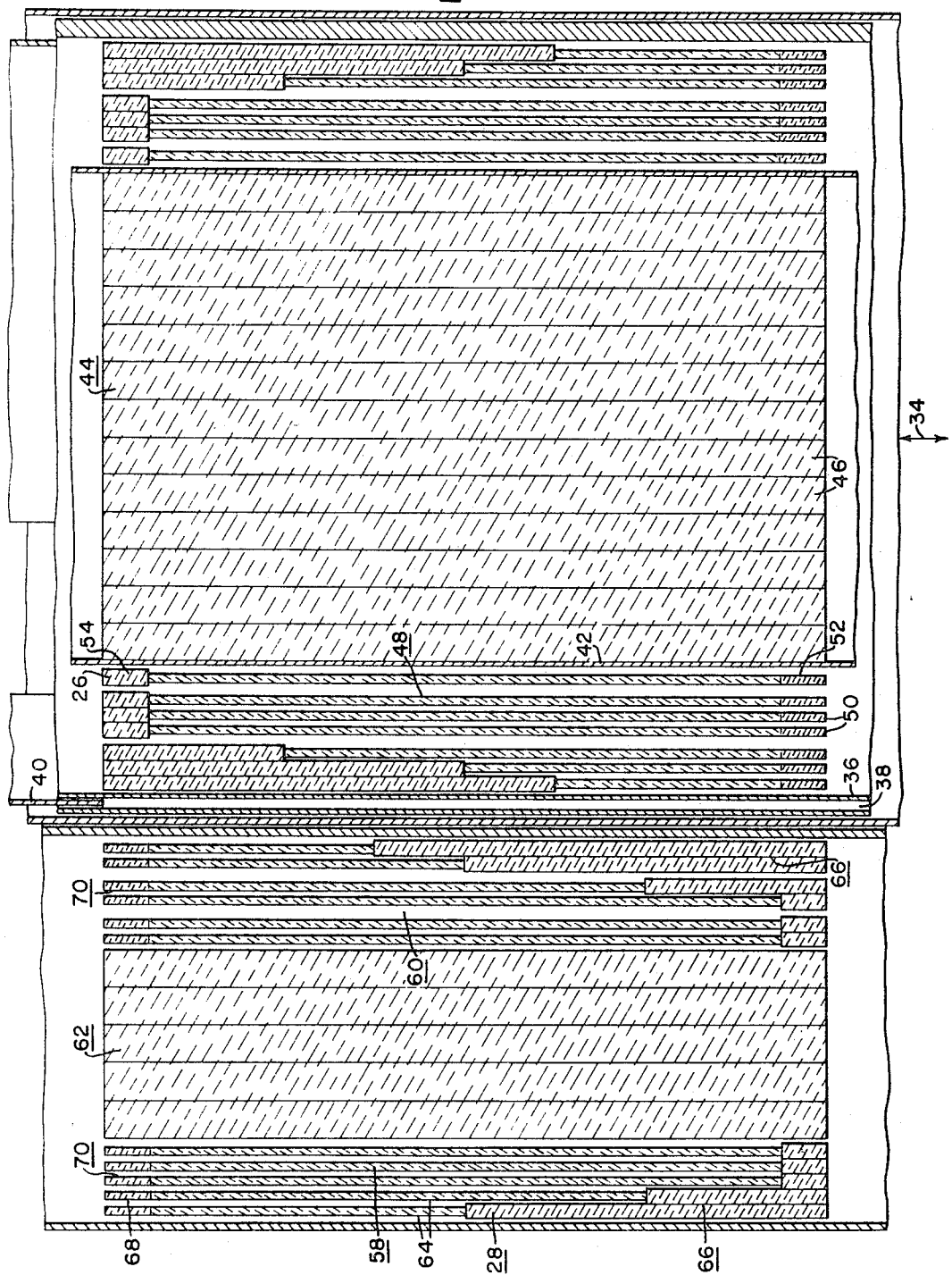

United States Patent Office 3,335,060
Patented Aug. 8, 1967

3,335,060
SEED-BLANKET NEUTRONIC REACTOR
Richard L. Diener, Penn Hills Township, Pittsburgh, Pa., assignor, by mesne assignments, to the United States of America as represented by the United States Atomic Energy Commission
Filed Sept. 20, 1965, Ser. No. 488,486
13 Claims. (Cl. 176—12)

This invention relates generally to neutronic reactors of the seed-blanket type and more particularly to such seed-blanket reactors wherein reactivity control is achieved by moving portions of the seed and blanket into and out of the reactive region of the core. More particularly, this invention is directed to a new and improved arrangement of the seed and blanket regions which increases the fuel worth of each movable fuel assembly in the reactor core thereby shortening the movement or "stroke" necessary to achieve reactivity control.

In connection with this invention, it will be appreciated that the term "annular," as used herein, is not to be restricted to a member having inner and outer peripheries of circular configurations; the term annular is intended herein to include a member with inner and outer peripheries having configurations other than circular.

In a development of the Large Seed-Blanket Reactor plant (LSBR), it was deemed desirable to provide a stationary lattice of chevron shaped assemblies having a plurality of axially extending circular openings positioned equidistantly therein which would be filled by cylindrical movable fuel assemblies. A shutdown rod channel of annular configuration surrounds each of the movable fuel assemblies with the channels being filled with coolant-moderator (light water) during normal reactor operation. A plurality of separate seeds are positioned in the reactor core with a portion of each seed being formed adjacent the periphery of each movable fuel assembly and the remainder of each seed being positioned in the stationary lattice surrounding each of the movable fuel assemblies. The central region of the movable assembly and the remaining regions of the stationary lattice are filled with fertile blanket fuel such that when the movable assemblies are partially removed from the reactor core, a portion of the seed and the blanket would be decoupled from the stationary seed and blanket portions to reduce core reactivity. The original seed arrangement as described in an application for Letters Patent Serial No. 418,571, filed December 15, 1964, now Patent No. 3,219,535 by T. R. Robbins, illustrated in FIGS. 10 through 12 thereof is a generally wedge shaped seed wherein the longest axial dimension of the seed is positioned adjacent the shutdown rod channel and wherein the axial dimension of the seed decreases in the direction radially away from the shutdown rod channel. With the Robbins seed arrangement, it was determined that power peaking in the seed occurs adjacent to the shutdown rod channel and that the worth of the movable assemblies is so low that the achievement of reactivity control by moving the movable assembly out of the reactor core necessitates a substantial stroke to obtain reactivity control throughout core lifetime. For example, for certain reactor arrangements, to maintain reactivity control throughout the core lifetime, a change in fuel position of approximately 120 centimeters is required with the fuel position.

It is a purpose of the present invention to increase the coupling between the seeds thereby increasing the worth of the moving fuel and concurrently shortening the stroke of the moving fuel to obtain reactivity control. In addition, the present invention moves the power peaking in the seed away from the shutdown rod channel at the beginning of life and also reduces the power peaking in the reactor core.

It will be appreciated that the present invention is particularly applicable to a converter-recycle breeder reactor core utilizing seed regions composed of a mixture of $U^{233}$ and $Th^{232}$ fuel and a blanket of $Th^{232}$. However, the principles of this invention are also applicable to other seed-blanket reactor types utilizing different fuel combinations, for example, a $U^{235}$ seed and a $Th^{232}$, $U^{238}$ or depleted $U^{238}$ blanket in a converter-burner reactor core arrangement.

Accordingly, it is an object of this invention to provide a new and improved seed arrangement for a seed-blanket reactor core.

A further object of this invention is to provide a reactor core of the seed-blanket type which is controlled through the use of moving seed fuel wherein the stroke of the moving fuel is substantially reduced.

A further object of this invention is to provide a seed-blanket reactor wherein reactivity control is obtained through the use of moving seed fuel and wherein the moving seed fuel is separated from stationary fuel by a water channel, the seed fuel region being formed such that the power peak at the beginning of life does not occur adjacent to the coolant channel.

Briefly, the present invention accomplishes the above-cited objects by providing a seed arrangement for a seed-blanket reactor core having one or more seeds therein wherein each seed is divided into a stationary and movable region. The reactor core includes a coolant channel positioned intermediate the stationary and movable seed regions with each of the seed regions being formed with a portion thereof positioned contiguous to the intermediate coolant channel and with the remainder of each of the seed regions receding from the intermediate coolant channel. Desirably, the stationary seed region recedes from the coolant channel toward one end of the reactor core while the movable seed region recedes from the coolant channel toward the opposite end of the reactor core. Blanket fuel material is positioned between the tapered portions of each of the seed regions and the intermediate coolant channel. In accordance with the invention, the receding seed regions may be formed of a stepped configuration or may be continuously tapered to recede from the coolant channel. With this arrangement, it has been determined that the coupling between the stationary and movable seed regions is improved such that the stroke or movement of the movable fuel to achieve reactivity control is reduced (approximately 40 cm. movement for the same lifetime as a prior art arrangement requiring a 120 cm. stroke). Concurrently, by minimizing the stroke of the movable fuel, the loss of neutrons to the reactor by that portion of the movable fuel which is positioned outwardly of the extremities of the reactor core is concurrently reduced. When used in a converter-recycle breeder reactor utilizing a $U^{233}$-$Th^{232}$ seed fuel mixture and a $Th^{232}$ blanket, it has been determined that the breeding performance of the reactor core is improved since the power peaking early in core life occurs away from the intermediate coolant channel. In addition, the blanket power fraction is improved since there now exists more blanket fuel surrounding the seed. Breeding performance is further improved by preventing neutron losses to the reflector region by virtue of the decrease in stroke. In addition, the contact area between the seed and dry blanket regions is increased when compared with prior arrangements.

These and other objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 6 is a vertical sectional view similar to FIG. 5 through the converter-recycle breeder fuel module of FIG. 4 and taken along the lines VI—VI thereof.

Figure 1:
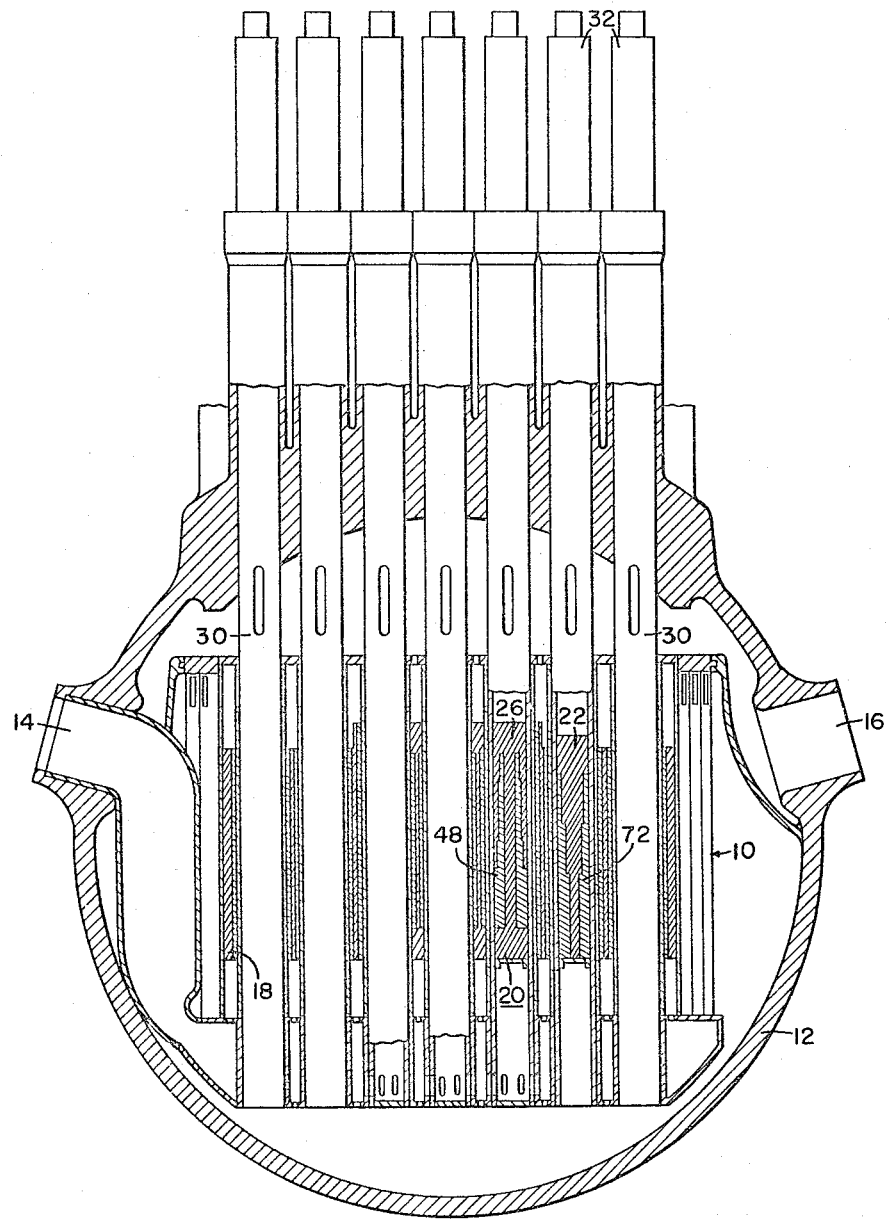
FIGURE 1 is a vertical, sectional view of a nuclear reactor embodying the principles of this invention.

Referring to the reactor arrangement of FIGS. 1 through 6, there is illustrated a seed-blanket neutronic reactor embodying the principles of this invention wherein a converter-recycle breeder region is disposed centrally of and is surrounded by a converter-burner region. The new and improved seed arrangement of this invention is employed in the instant reactor arrangement only in the converter-recycle breeder section.

The reactor core, identified by the reference character 10 is fixedly positioned in a spherically shaped pressure vessel 12 having an inlet flow nozzle 14 and an outlet flow nozzle 16 formed therein. The core 10 is formed from an assemblage of fifty-five modules resulting in a generally hexagonal cross section, forty-eight of the modules forming the annular converter-burner portion of the reactor core and are identified by the reference character 18 while seven central modules form the converter-recycle breeder portion of the core with each module being identified by the reference character 20. Viewing FIGS. 2 and 3, it will be seen that each converter-burner module 18 includes a central movable assembly 22 of cylindrical configuration and three chevron shaped stationary assemblies 24 surrounding the movable assembly 22. Similarly, each module 20 of the central converter-recycle breeder region of the reactor core 10 includes a movable inner assembly 26 of generally circular cross section and three chevron shaped stationary assemblies 28 positioned outwardly of and surrounding the movable assemblies 26. For a more specific description of the reactor core 10 and in particular of the converter-burner portion thereof, reference may be had to the copending application of Harry F. Raab, Jr. et al., Serial No. 488,487, filed concurrently herewith, and entitled "Seed-Blanket Converter Recycle Breeder Reactor" assigned to the same assignee as this application.

Each of the modules 18 and 20 has the movable portions 22 and 26 thereof respectively positioned within an elongated shroud 30 for vertical movement therewithin into and out of core 10. Movement of the movable assemblies 22 and 26 is achieved by control mechanisms 32 which are secured to the upper ends of each of the shrouds 30.

Figure 4:
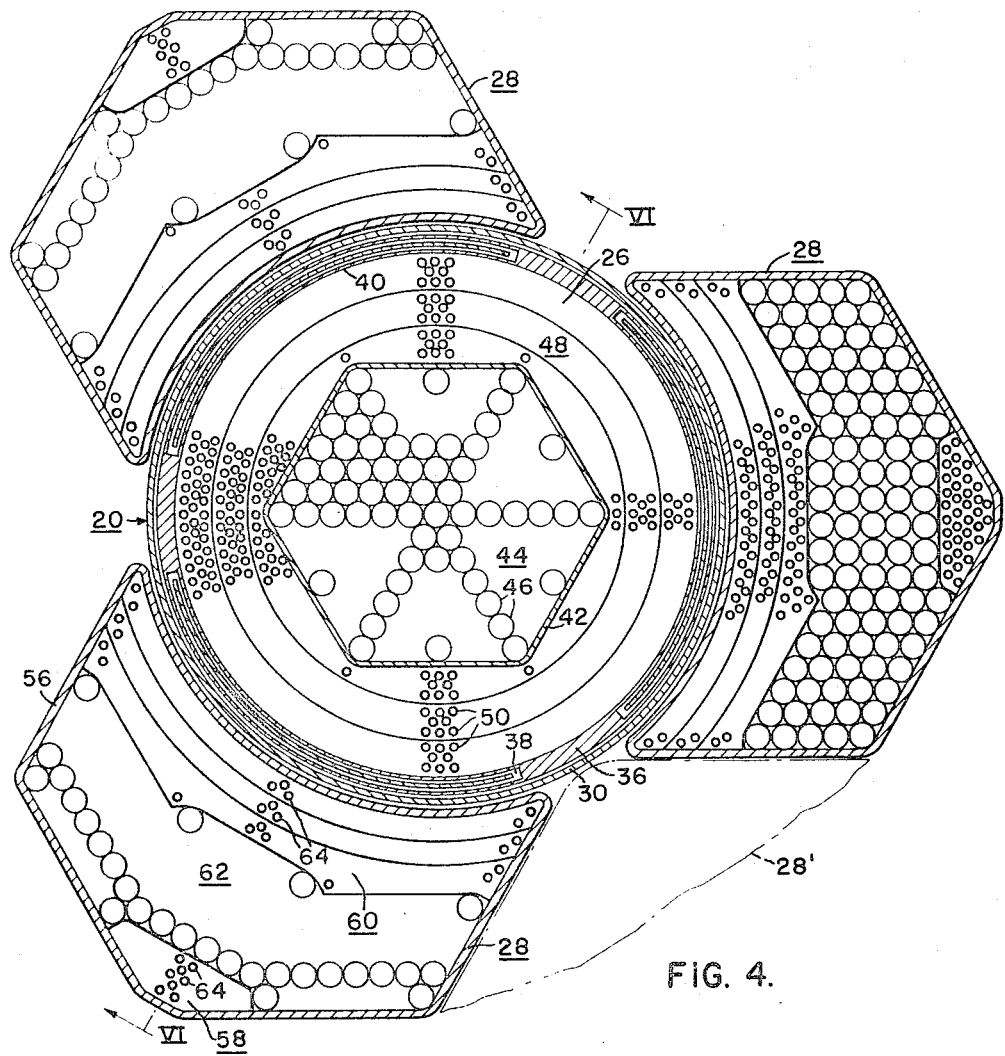
FIG. 4 is a horizontal sectional view through a single converter-recycle breeder fuel module.
Figure 5:
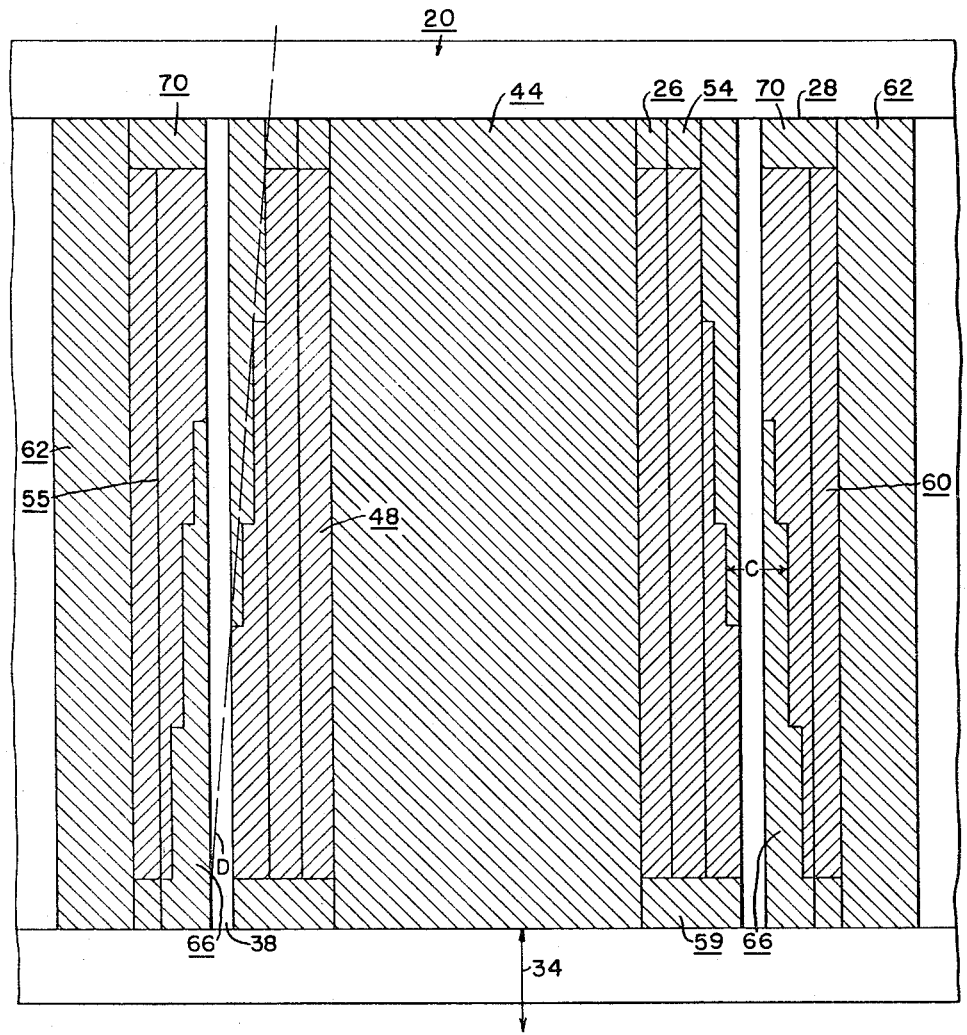
FIG. 5 is a schematic vertical section through one of the converter-recycle seeds and its adjacent blanket depicting certain fuel zones therein.

Referring now to the converter-recycle modules 18 and 20 of FIGS. 4 through 6, it will be seen that each of the movable core assemblies 26 is disposed for axial movement within its shroud 30 into and out of the reactive region of core 10 in the directions depicted by the arrow 34. The movable core assembly 26 is surrounded by a tubular outer support plate 36 in which shutdown rod channels 38 are disposed. Each module 20 includes three shutdown rods 40 formed from a suitable material such as hafnium and positioned for axial movement within channels 38. Three channels 38 are formed in outer support 36 and are positioned equidistantly about the periphery of movable assembly 26. The shutdown rods 40 move independently relative to core 10 and relative to movable assemblies 26.

A generally hexagonal support member 42 is disposed concentrically within the outer support 36 and contains therein a blanket region 44 of blanket fuel elements. Blanket region 44 is formed by a plurality of axially extending rods or tubes 46 which extend the full length of the core active region and which desirably are formed from a corrosion resistant material having a relatively low neutron capture cross section, for example from an alloy of zirconium. Each of the full length blanket fuel tubes 46 is capped at the ends thereof (not shown) and may contain for example a plurality of tandemly stacked pellets of fertile fuel material for example thorium–232 in oxide form. The cladding tubes 46 are fixedly positioned and axially spaced from one another by a suitable means known in the art for example, by spacing grids (not shown). In this example of the invention, the blanket region 44 is made to be extremely dry. Thus, for a light water moderated and cooled reactor, the hydrogen to thorium ratio of the blanket region 44 is substantially smaller than the equivalent ratios for the blanket regions of the converter-burner modules 18.

Disposed intermediate the support members 36 and 42 is a seed region 48 of annular configuration. The seed region 48 comprises a plurality of clad fuel elements 50 such that the seed region is positioned centrally of and intermediate the ends of the fuel elements 50. Fuel elements 50 in this instance include upper and lower blanket regions 52 and 54 extending respectively from above and below the seed fuel to the ends of elements 50. Each of the blanket regions 52 and 54 contains fertile material which serves to limit the leakage of neutrons produced by the seed fuel from the ends of core 10. In this instance, the seed fuel desirably comprises a mixture of uranium–233 and thorium–232, both in oxide form with the $U^{233}O_2$ comprising approximately 10 weight percent of the fuel. To form the blanket region 52 to be as dry as possible, each of the fuel elements 50 is formed to have a dual diameter, that is the diameter of the seed portion of the fuel element 50 is smaller than the diameter of the blanket portion thereof. However, from a mechanical design portion, it has been deemed desirable to have only one small diameter to large diameter transition in each of the fuel tubes 50. Thus for structural regions, the blanket region 54 disposed below the seed region 48 in this instance comprises a "wet" blanket region.

As can be seen from FIGS. 5 and 6, the seed 48 is surrounded by a barrier of coolant formed by shutdown rod channels 38 and which separates the movable assemblies 26 from the stationary assemblies 28. The seed 48 is tapered to recede from the coolant channel 38 toward the top or upper end of core 10. In this example, the seed region 48 comprises a stepped configuration with the steps facing the upper end of core 10. Disposed intermediate seed 48 and the coolant channel 38 is a continuation of the upper blanket region 54 such that the blanket region 54 is stepped complementarily with the seed region 48.

Figure 2:
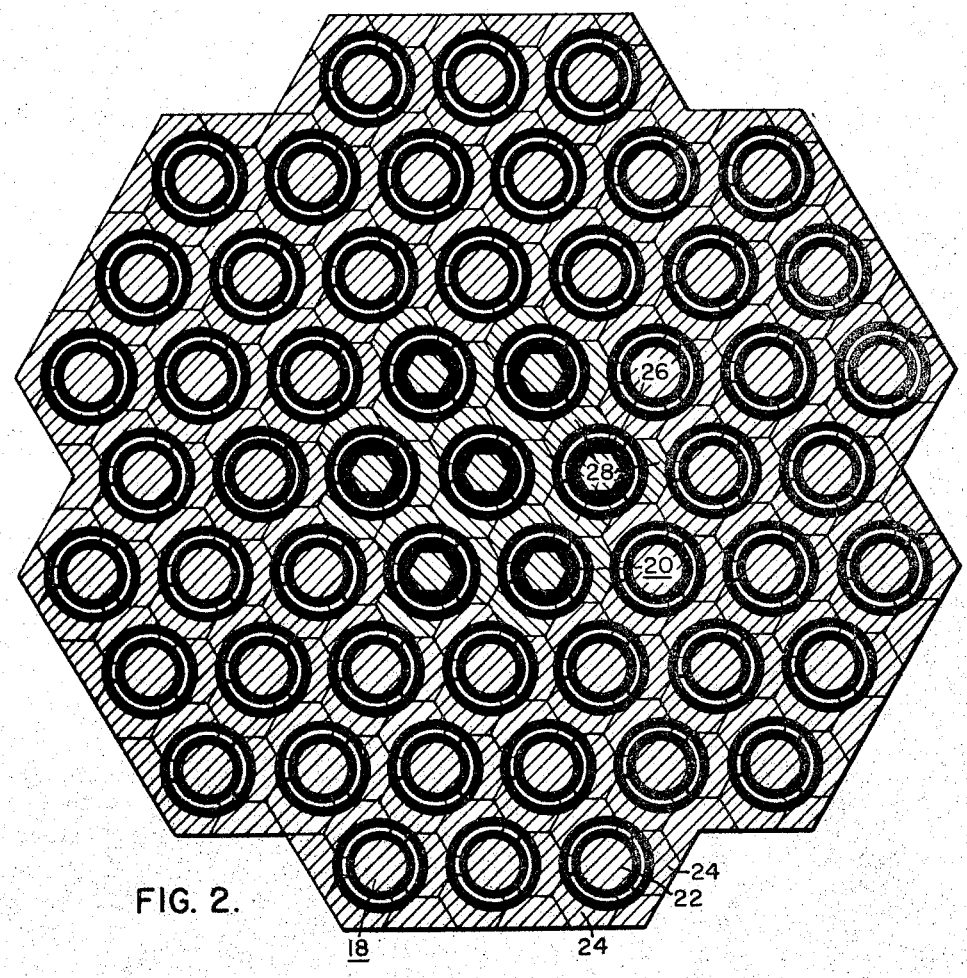
FIG. 2 is a schematic, horizontal sectional view through the reactor core of FIG. 1 and illustrating a converter-burner reactor having a converter-recycle breeding region in the center thereof.
Figure 3:
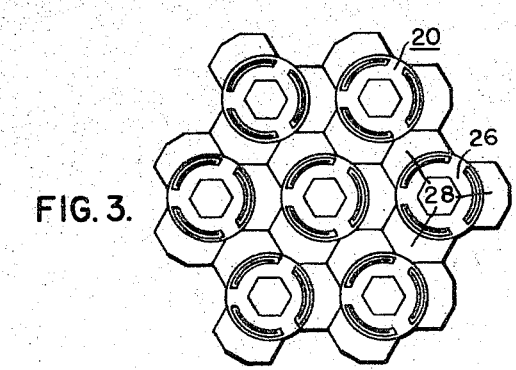
FIG. 3 is a diagrammatic, horizontal view of the converter-recycle breeder region of the reactor core of FIG. 2.

With reference to the chevron shaped stationary assemblies 28 of the module 20, it will be appreciated that three chevron shaped assemblies 28 are equidistantly spaced about the periphery of shroud 30 so that a chevron shaped assembly in the next adjacent fuel module is nested between the adjacent ones of the assemblies 28 of a module 20, as depicted by the dashed lines 28' of FIG. 4. Each of the assemblies 28 includes an outer support member 56 which extends axially along the entire length of the core 10 and in which the fuel elements of the stationary assembly 28 are positioned. The assembly 28 is divided into a pair of spaced seed regions 58 and 60 which extend axially therealong and are positioned adjacent to in two generally opposed sides of the assembly 28. The remainder of the chevron assembly 28 is filled with a blanket region 62 such that when the modules 20 are assembled within core 10, each of the movable assemblies 26 is surrounded by a generally annular stationary seed formed by nested seed regions 58 and 60 which in turn is surrounded by a concentric blanket formed by regions 62 of adjacent stationary assemblies 28, as illustrated in FIGS. 2 and 3. Each of the stationary seed regions 58 and 60 is formed from a plurality of dual diameter fuel rods or elements 64 which are similar in form to the fuel rods 50. Thus each seed fuel rod 64 is formed with one small diameter to a large diameter step at a given axial position thereof. The dual diameter rod 64 is also tapered to recede from the coolant channel 38 and in this example of the invention are tapered in the opposite direction from movable seed portion 48 to form a stepped seed configuration with the steps facing downwardly (FIGS. 5 and 6) in opposed relationship with the steps of the fuel elements 50. The large diameter segments of the fuel rods 64 are filled with blanket material so as to provide a dry blanket region 66 adjacent the lower ends of each of the seed fuel rods 64. The upper end of each of the fuel rods 64 is also filled with blanket fuel material at positions above the line 68 to form a wet blanket region 70 in order to minimize neutron leakage from the upper ends of seed region 58.

As seen in FIG. 1, the movable seed region 72 of each converter-burner fuel module 18 is also of a stepped configuration with the steps being positioned adjacent the central blanket region of the movable assembly 22 rather than adjacent the shutdown rod channel 38 for the converter-recycle fuel modules 20. The converter-burner region of the reactor core 10 provides for reactivity control through the movement of movable assemblies 22 into and out of the reactive region of core 10. However, the use of the configuration of seeds 72 for the converter-recycle modules 20 would result in a poorer performance core and in the necessity for a substantially longer stroke to obtain a given amount of reactivity control in the converter-recycle breeder portion than is found to be necessary with the stepped configuration of movable seeds 48.

In addition, it has been determined that the seed arrangements 48 and 60 also improve other aspects of a converter-recycle core when compared with the seed configuration 72 and with the seed configurations illustrated in the aforementioned Robbins application.

Reactivity control is achieved by axial movement of the movable assembly 26 in the directions indicated by the arrow 34. When movable assembly 26 is in the position illustrated in FIG. 5, the movable seed portion 48 has a given coupling with the surrounding stationary seed formed by seed regions 58 and 60. As assembly 26 moves downwardly, the thickness of the coupled movable and stationary seed portions decreases and concurrently the coupling therebetween decreases. In the Robbins arrangement, the long side of the movable and stationary seed portions are positioned adjacent the intermediate water channel while in the instant arrangement the long side of the seed region 48 is positioned adjacent the dry central blanket 44 and the long sides of the stationary seeds formed by 44 and 46 are positioned adjacent the dry stationary blanket 62. Thus, with the instant arrangement, the dry blanget regions 44 and 62 are exposed to neutron leakage from a larger seed area. Since blanket material positioned between movable seed 48 and coolant channel 38 and also between the stationary surrounding seed formed by seed regions 58 and 60 and coolant channel 38 in accordance with the invention, power peaking occurs away from the coolant channel 38 early in core life rather than adjacent to the coolant channel as with the prior art arrangement. The latter blanket regions also serve to increase the blanket power fraction in the reactor, improve the distribution of fission products in the core and reduce the reflector losses when compared with the Robbins arrangement.

It has been determined that the slope of the taper of the seed regions as illustrated by the dashed line D in FIG. 5 has a substantial influence on the movable fuel position. Variation of the slope D influences greatly the fuel positions for reactivity control.

Considering now the dimension C of FIG. 5, it will be appreciated that the dimension C is constant in the arrangement taught by Robbins but that this dimension varies, in accordance with the invention, with the position of the movable assembly 26. This variation in the dimension C causes increased coupling of the seed regions with lifetime, increased fuel worth with lifetime and a shorter fuel stroke for a given lifetime to obtain reactivity control.

Calculations have been performed comparing the blanket arrangement of the instant invention with the aforedescribed prior art arrangements. These calculations have shown that for a converter-recycle breeder reactor of the type described in a copending Raab et al. application, the seed arrangement of this invention produces a substantially lower and almost constant protactinium-233 absorption density over core lifetime in the seed and duplex blanket regions of the converter-recycle reactor. (The duplex blanket is that blanket portion formed by the duel diameter rods 50 and 64.) In the dry blanket regions 44 and 62, there is no substantial change in the protactinium-233 absorption density. The axial power distribution in both the movable fuel and stationary fuel portions of the core are more constant than with the prior art arrangement. The total blanket power fraction of the core lifetime increases with the core arrangement of this invention. The seed power density over core lifetime decreases when compared with the prior art arrangement, while concurrently the blanket power density in the dry blanket regions remains almost the same as with the prior art arrangement. At the same time, the blanket power density in the duplex blanket regions of the instant arrangement increases substantially when compared with the equivalent blanket region in the prior art arrangement.

A comparison of the fuel worth of the movable fuel over the core lifetime indicates that the worth of the prior art arrangement is slightly higher than the equivalent fuel worth of the arrangement of the instant invention at the beginning of life but that the fuel worth of the arrangement of the present invention soon becomes greater than that of the prior art and remains greater for approximately 75% of the core lifetime.

It will be appreciated that main modifications may be made in the specific embodiment of this invention as described herein without departing from the broad spirit and scope of the invention. Accordingly, it is specifically intended that the embodiment described in detail herein be interpreted as illustrative of the invention rather than as limitative thereof.

I claim as my invention:

1. In a heterogeneous neutronic reactor of the seed-blanket type, a reactor core forming a reactive region and having at least one fissile fueled seed and at least one fertile fueled blanket, means for controlling the excess reactivity in said core by moving a portion of said seed out of said reactive region, said seed having an elongated stationary seed portion of annular configuration surrounding an elongated generally cylindrical movable seed portion, said core forming an elongated coolant channel positioned between said stationary and movable seed portions, said stationary and movable seed portions being tapered to recede in opposite directions from said coolant channel, and blanket material interposed between the tapered portions of said stationary and movable seed portions and the coolant channel.

2. In a heterogeneous neutronic reactor of the seed-blanket type, a reactor core forming a reactive region, at least one seed comprising a pair of concentric annular seed portions of fissile material disposed in said reactor core, said seed being surrounded by a blanket of fertile material, means for controlling the excess reactivity in said core by moving one of said concentric seed portions out of said reactive region, said core forming a coolant channel positioned between said concentric seed portions, at least one of said seed portions being tapered to recede from said coolant channel, and said core having a fertile blanket region interposed between said one seed portion and said coolant channel.

3. In a heterogeneous neutronic reactor of the seed-blanket type, a reactor core forming a reactive region and having at least one fissile fueled seed and at least one fertile fueled blanket, means for controlling the excess reactivity in said core by moving a portion of said seed out of said reactive region, said seed having an elongated stationary seed portion of annular configuration surrounding an elongated generally cylindrical movable seed portion, said core forming an elongated coolant channel positioned between said stationary and movable seed portions, said stationary seed portion being stepped to recede from said coolant channel with the steps facing one end of said core, a complementarily stepped stationary blanket portion interposed between said stepped seed portion and said coolant channel, said movable seed portion being stepped to recede from said coolant channel with the steps facing the other end of said core and a complementarily stepped movable blanket portion interposed between said stepped movable seed portion and the coolant channel.

4. The neutronic reactor of claim 3 wherein a portion of each of said stationary and movable seed portions is positioned contiguous to said coolant channel.

5. The neutronic reactor of claim 3 wherein a fertile blanket region is interposed intermediate the ends of each of said seed portions and the corresponding end of said reactor core.

6. The neutronic reactor of claim 1 wherein the movable seed portion is of annular configuration and surrounds a central blanket region.

7. The neutronic reactor of claim 1 wherein each of the seed portions terminates intermediate the ends of the reactor core and wherein blanket material is positioned between each of the ends of the seed portions and the corresponding ends of the reactor core.

8. The neutronic reactor of claim 1 wherein each of the seed portions terminates intermediate the ends of the reactor core and wherein blanket material is positioned between each of the ends of the seed portions and the corresponding ends of the reactor core, and wherein the movable seed portion is of annular configuration and surrounds a central blanket region.

9. The neutronic reactor of claim 3 wherein the movable seed portion is of annular configuration and surrounds a central blanket region.

10. The neutronic reactor of claim 1 wherein the seed is fueled with a $U^{233}$-$Th^{232}$ fuel mixture and wherein the blanket is fueled with $Th^{23}$.

11. The neutronic reactor of claim 2 wherein the seed is fueled with a $U^{233}$-$Th^{232}$ fuel mixture and wherein the blanket is fueled with $Th^{232}$.

12. In a heterogeneous neutronic reactor, a reactor core forming a reactive region having sectors of fuel elements therein containing fuel materials of differing fissile to fertile fuel concentrations, a pair of concentric elongated annular fuel assemblies disposed in said reactor core forming an annular coolant channel therebetween, one of said fuel assemblies including a plurality of elongated fuel elements arranged in a plurality of concentric annular rows, each of said fuel elements containing longitudinally extending zones of fuel of different fissile to fertile fuel concentrations therein, the fuel elements located in the annular row closest to said coolant channel containing a smaller amount of fissile fuel therein than those fuel elements located in those rows positioned further away from said coolant channel, whereby reactivity peaking in said coolant channel is minimized, and one of said concentric assemblies being movable into and out of said reactive region to vary the excess reactivity in said core.

13. In a heterogeneous nuclear reactor, a reactor core forming a reactive region having sectors of fuel elements therein of different fissile to fertile fuel concentrations, a pair of elongated concentric annular fuel assemblies disposed in said reactor core, said core forming an elongated annular coolant channel positioned between said concentric fuel assemblies, at least one of said concentric fuel assemblies being movable into and out of said reactive region to vary the excess reactivity in said core, said one concentric fuel assembly comprising a plurality of concentric annular rows of elongated fuel elements, the fuel elements of each row being fueled with fissile and fertile fuel material with the amount of fissile fuel in those fuel elements located in the annular row closest to said channel being less than the amount of fissile fuel in the fuel elements of those rows located further away from said coolant channel, said fissile fuel being positioned in said one assembly to maximize the magnitude of the reactivity along the coolant channel created by said one assembly at at least one point therein adjacent one longitudinal extremity of said coolant channel and to decrease the magnitude of the reactivity in the longitudinal direction along said coolant channel extending from said last-mentioned point toward the other extremity of said coolant channel, the other of said concentric assemblies comprising a plurality of concentric annular rows of elongated fuel elements, the fuel elements in each of the last-mentioned annular rows being fueled with fissile and fertile fuel materials with the fissile fuel content of those fuel elements located in the annular row closest to said coolant channel being less than the fissile fuel content of the fuel elements located in those annular rows positioned further away from said coolant channel, said fissile fuel being positioned in said fuel elements of said other assembly to maximize the magnitude of the reactivity along said coolant channel created by said other assembly at at least a point therein adjacent the other extremity of said coolant channel and to decrease the magnitude of the reactivity created by said other assembly in the longitudinal direction along said coolant channel extending from said last-mentioned point toward said one extremity of said coolant channel.

References Cited
UNITED STATES PATENTS 3,219,535    11/1965    Robbins    176—17
3,252,867    5/1966    Conley    176—18

CARL D. QUARFORTH, *Primary Examiner.*

L. DEWAYNE RUTLEDGE, *Examiner.*

H. E. BEHREND, *Assistant Examiner.*